(12) United States Patent
Palfai et al.

(10) Patent No.: US 8,636,619 B2
(45) Date of Patent: Jan. 28, 2014

(54) GEAR SHOCK CONTROL MEMBER FOR A DRIVE TRAIN COMPONENT GEAR SET

(75) Inventors: Balazs Palfai, Fishers, IN (US); Attila Nagy, Fishers, IN (US); Andrew Meyer, Fortville, IN (US)

(73) Assignee: Remy Technologies, L.L.C., Pendleton, IN (US)

(*) Notice: Subject to any disclaimer, the term of this patent is extended or adjusted under 35 U.S.C. 154(b) by 511 days.

(21) Appl. No.: 12/950,589

(22) Filed: Nov. 19, 2010

(65) Prior Publication Data

US 2012/0129647 A1 May 24, 2012

(51) Int. Cl.
*F16H 57/08* (2006.01)
(52) U.S. Cl.
USPC .......................................................... 475/347
(58) Field of Classification Search
USPC .......... 475/346, 347, 149, 150; 74/421 A, 7 E
See application file for complete search history.

(56) References Cited

U.S. PATENT DOCUMENTS

| | | | | |
|---|---|---|---|---|
| 2,400,789 A | * | 5/1946 | Thornburg | 475/149 |
| 2,548,258 A | * | 4/1951 | Griffith | 475/245 |
| 3,090,258 A | * | 5/1963 | Zink et al. | 475/338 |
| 4,106,366 A | * | 8/1978 | Altenbokum et al. | 475/344 |
| 4,193,325 A | * | 3/1980 | Cotreau | 475/337 |
| 4,528,470 A | * | 7/1985 | Young et al. | 310/78 |
| 4,561,316 A | * | 12/1985 | Bolz et al. | 74/7 E |
| 5,307,702 A | * | 5/1994 | Spellman et al. | 74/7 E |
| 6,733,414 B2 | * | 5/2004 | Elger | 475/331 |
| 7,018,314 B2 | * | 3/2006 | Hasegawa et al. | 475/5 |
| 8,272,282 B2 | * | 9/2012 | Kawasaki et al. | 74/7 E |

FOREIGN PATENT DOCUMENTS

JP 55-5438 * 1/1980

* cited by examiner

*Primary Examiner* — Sherry Estremsky
(74) *Attorney, Agent, or Firm* — Cantor Colburn LLP

(57) ABSTRACT

A drive train component includes a housing having a plurality inner surfaces that collectively define an interior portion. A gear set is arranged within the interior portion. The gear set includes a first side and a second side. A gear shock control member is positioned between one of the first and second sides of the gear set and an adjacent component. The gear shock control member includes a plurality of pre-loaded biasing members that direct an axial force onto the gear set.

5 Claims, 4 Drawing Sheets

GEAR SHOCK CONTROL MEMBER FOR A DRIVE TRAIN COMPONENT GEAR SET

BACKGROUND OF THE INVENTION

Exemplary embodiments pertain to the art of drive train components and, more particularly, to a gear shock control member for a gear set of a drive train component.

Engineers are exploring various methods to save weight and space in the design and construction of motor vehicles. In addition to weight and space concerns, engineers are investigating various propulsion systems to replace and/or augment fossil fuels. One current area of investigation is the use of electric powered vehicles. In an electric powered vehicle, space and weight are of concern. Lowering component weight will lead to an enhanced operational envelope for electric motors. That is, the less weight the electric motor must move, more energy can be devoted to moving the vehicle and prolonging operational time.

Drive train components such as motors, transmissions, differentials, and the like, require a great deal of power to operate. Drive train components typically include large housings that support multiple gears, bearings and shafts. During operation, sudden stopping of the vehicle releases kinetic energy into the transmission that creates torsional forces. The torsional forces stress internal transmission components. The stress on the internal transmission components may lead to gear damage that could lower an overall operational life of the drive train component.

BRIEF DESCRIPTION OF THE INVENTION

Disclosed is a drive train component including a housing having a plurality inner surfaces that collectively define an interior portion. A gear set is arranged within the interior portion. The gear set includes a first side and a second side. A gear shock control member is positioned between one of the first and second sides of the gear set and an adjacent component. The gear shock control member includes a plurality of pre-loaded biasing members that direct an axial force onto the gear set.

Also disclosed is a transmission member including a housing having a plurality inner surfaces that collectively define an interior portion. A stator housing is arranged within the housing. The stator housing includes at least one wall member. A stator assembly is arranged within the stator housing. A rotor assembly is arranged within the housing. The rotor assembly includes a hub portion. A gear set is arranged within the interior portion and operatively connected to the hub portion. The gear set includes a first side and a second side. A gear shock control member is positioned between one of the first and second sides of the gear set and an adjacent component. The gear shock control member includes a plurality of pre-loaded biasing members that direct an axial force onto the gear set.

Further disclosed is a method of dampening gear shock from a gear set in a drive component. The method includes applying a biasing force provided by a plurality of biasing member to an outer surface of the gear set.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
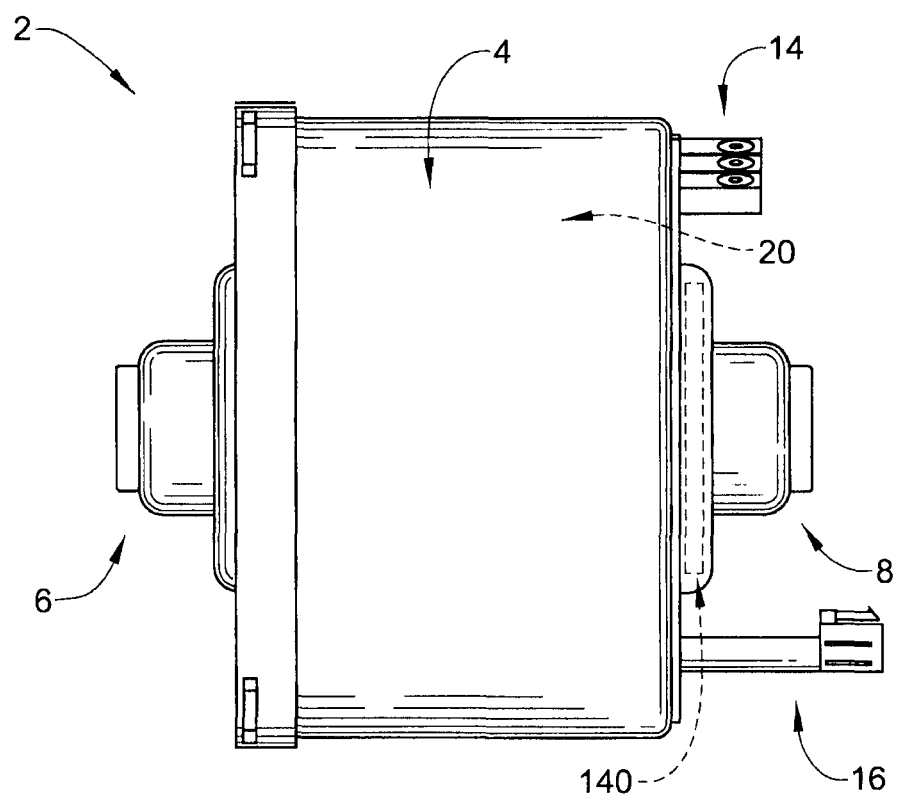
FIG. 1 is a plan view of a transmission member including a gear shock control member in accordance with an exemplary embodiment.
Figure 2:
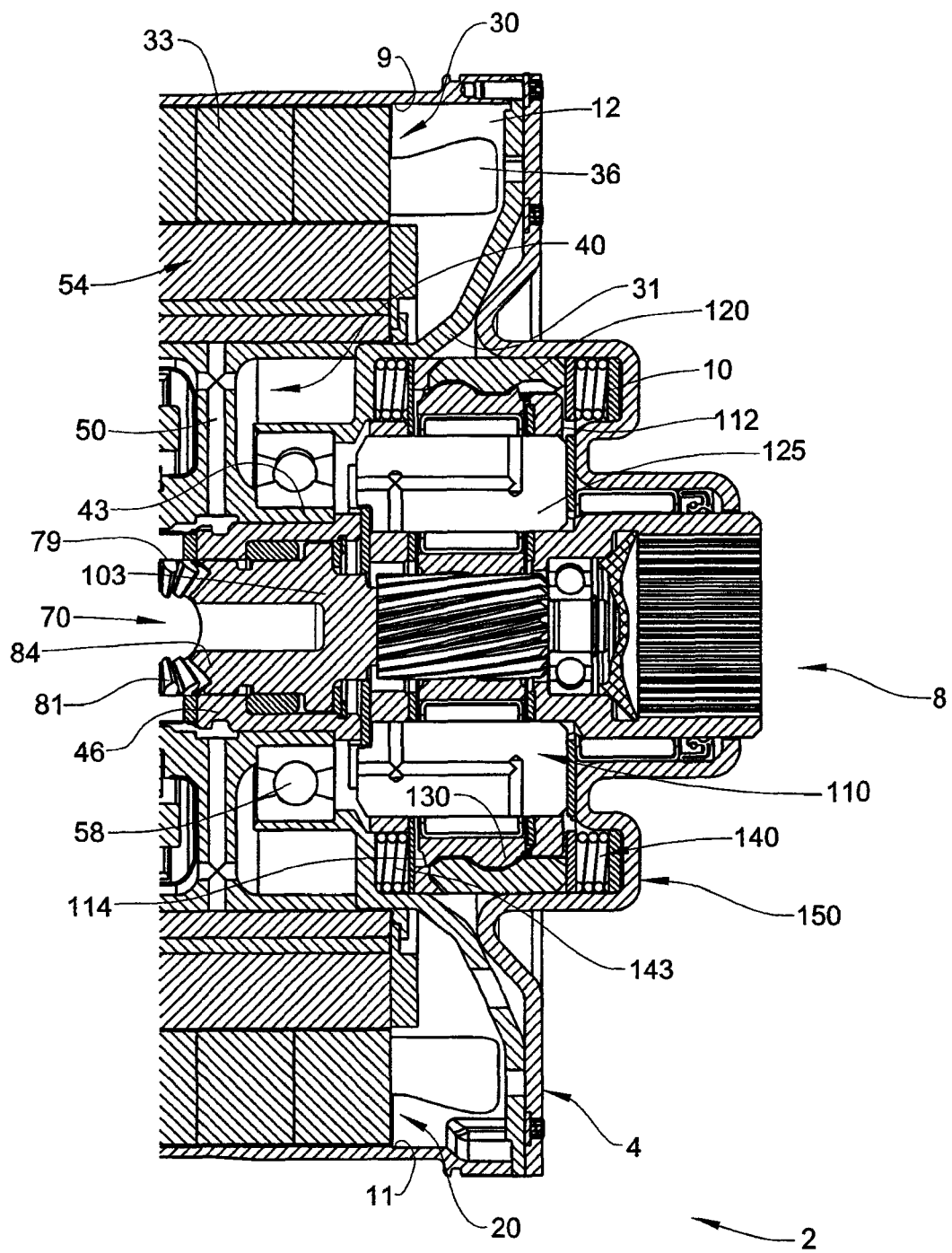
FIG. 2 is a partial cross-sectional view of the transmission member of FIG. 1 including a gear shock control member in accordance with one aspect of an exemplary embodiment.

With reference to FIGS. 1 and 2, a drive train component, shown in the form of a transmission member constructed in accordance with an exemplary embodiment is indicated generally at 2. Transmission member 2 includes a housing 4 having a first output hub 6 and a second output hub 8. Housing 4 includes a plurality of inner surfaces 9-11 that collectively define an interior portion 12. First and second output hubs 6 and 8 provide an interface to corresponding first and second drive wheels (not shown). Transmission member 2 is also shown to include electric power terminals 14 and a signal or sensor connector 16. As will be discussed more fully below, power terminals 14 and sensor connector 16 are electrically connected to an electric motor 20 arranged within interior portion 12 of housing 4.

As best shown in FIG. 2, electric motor 20 includes a stator assembly 30 having a stator housing 31. A stator core 33 is arranged within stator housing 31. Stator core 33 is surrounded by a plurality of stator windings 36. Electric motor 20 also includes a rotor assembly 40 that is rotatably mounted relative to stator assembly 30. Rotor assembly 40 includes a hub portion 43 that defines, at least in part, a carrier 46. Hub portion 43 also includes a lamination support element 50 that supports a plurality of rotor laminations 54. Carrier 46 is rotatably supported relative to stator housing 31 by at least two bearings, one of which is indicated at 58. As will be discussed more fully below, carrier 46 also supports a differential gear assembly 70.

Differential gear assembly 70 includes a first planet gear 79 and a second planet gear 81. First and second planet gears 79 and 81 are rotatably mounted to carrier 46. Although the exemplary embodiments illustrate differential gear assembly 70 with two planet gears, it should be understood that the number of planet gears can vary. Differential gear assembly 70 also includes first and second side gears, one of which is indicated at 84. Side gear 84 meshes or engages with first and second planet gears 79 and 81. Side gear 84 leads to an output member 103, which, as will be discussed more fully below, is operatively connected to output hub 8 through a reduction or planetary gear set 110.

Planetary gear set 110 serves as an interface between side gear 84 and at least one drive wheel (not shown). In the exemplary embodiment shown, planetary gear set 110 includes a first surface 112 and a second opposing surface 114. Planetary gear set 110 also includes a ring gear 120 that is fixedly mounted relative to housing 4. More specifically, ring gear 120 is operatively coupled to housing 4 though, for example, a plurality of splines (not shown). In this manner, ring gear 120 is restricted in rotation but can translate linearly in order to absorb torque forces as will be discussed more fully below. A carrier 125 is operatively coupled to ring gear 120 through a plurality of planet gears, one of which is indicated at 130 that are operatively coupled to output member 103. With this arrangement, operation of electric motor 20 creates a rotational force that is transferred through differential gear assembly 70 to output member 103. The rotation of output member 103 causes planet gears 130 to rotate within carrier 125. As planet gears 130 rotate at one rate, carrier 125 rotates at another rate. The rotation of carrier 125 is passed to output hub 8 and, by extension, to the at least one drive wheel (not shown).

In accordance with the exemplary embodiment, planet gears 130 include helical gear teeth (not separately labeled) that inter-engage or mesh to transfer rotational energy from output member 103 to output hub 8. Helical gears provide a smoother interface between carrier 125 and planet gears 130 that leads to quieter operation of the drive component. During operation, kinetic energy is stored in rotor assembly 40. When transmission member 2 is stopped, the stored kinetic energy is released through various drive train components including differential gear assembly 70, and output member 103 creating a spring torque that forces carrier 125 against planet gears 130 which may lead to an overload condition. In order to overcome detrimental effects associated with the development of the spring torque, the exemplary embodiment includes first and second gear shock control members 140 and 143 that dampen shocks that may occur between carrier 125 and planetary gears 130 as a result of sudden drive train stops.

Figure 3:
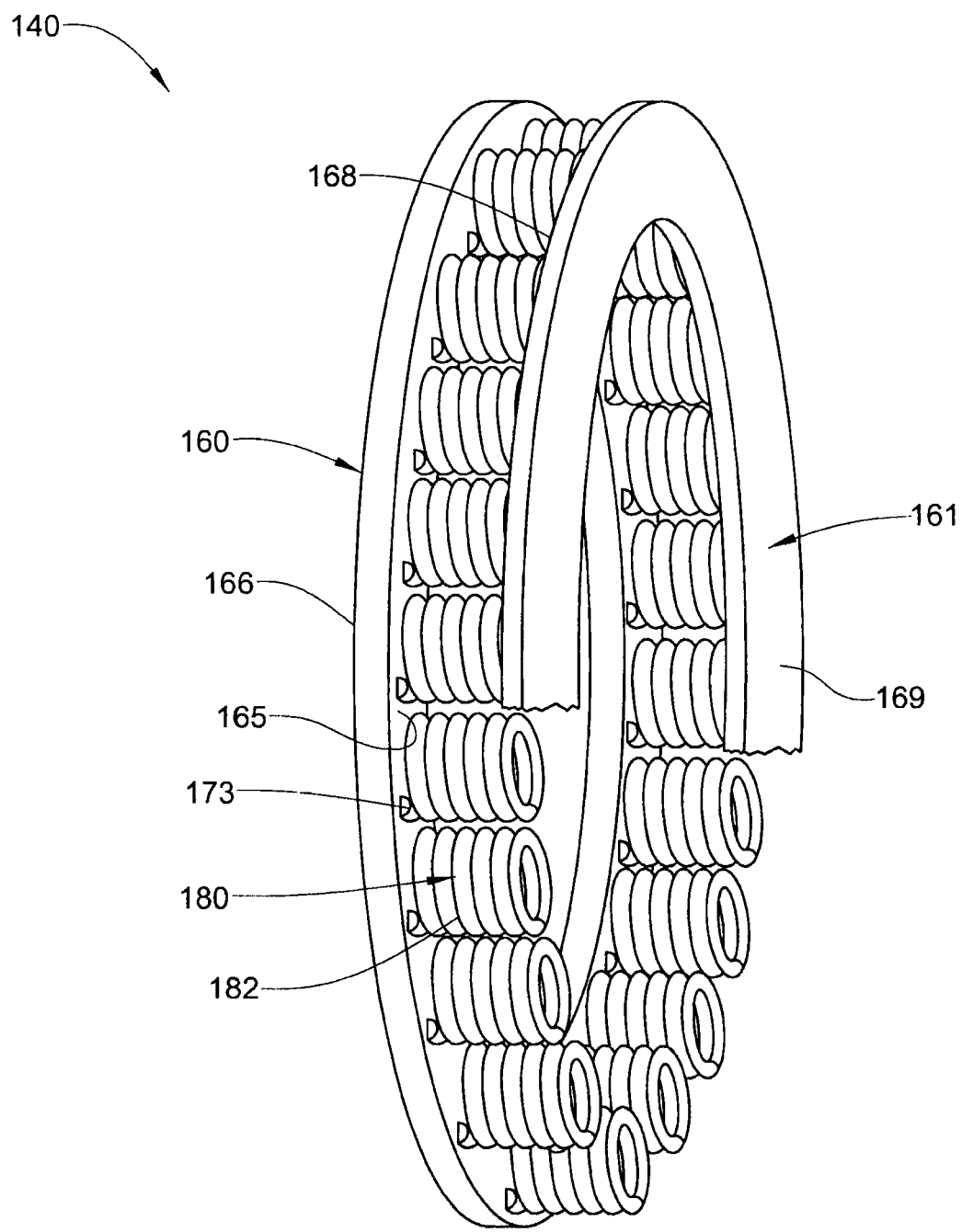
FIG. 3 is a perspective view of the gear shock control member of FIG. 2.

As shown, first gear shock control member 140 is arranged within an annular region 150 formed in housing 4 about output hub 8. More specifically, first gear shock control member 140 is arranged between inner surface 10 of housing 4 and first surface 112 of planetary gear set 110. Second gear shock control member 143 is arranged between stator housing 31 and second surface 114 of planetary gear set 110. At this point it should be understood that first and second gear shock control members 140 and 143 are substantially similar such that a detailed description will follow with reference to FIG. 3 in describing first gear shock control member 140 with an understanding that second gear shock control member 143 is similarly constructed. It should also be understood that while shown with two gear shock control members positioned to counter forces resulting from sudden stops of transmission member 2 gear set 110, a single gear shock control member could be positioned to counter the forces created by sudden transmission component stops.

As shown, first gear shock control member 140 includes a first plate member 160 and a second plate member 161. First plate member 160 includes a first surface 165 and an opposing second surface 166. Similarly, second plate member 161 includes a first surface 168 and an opposing second surface 169. First surface 165 of first plate member 160 is shown to include a plurality of locating elements, one of which is indicated at 173. Although not shown, first surface 168 of second plate member 161 is also provided with a plurality of locating elements. Locating elements 173 are configured to position a plurality of biasing members, one of which is indicated at 180, between first and second plate members 160 and 161.

Figure 4:
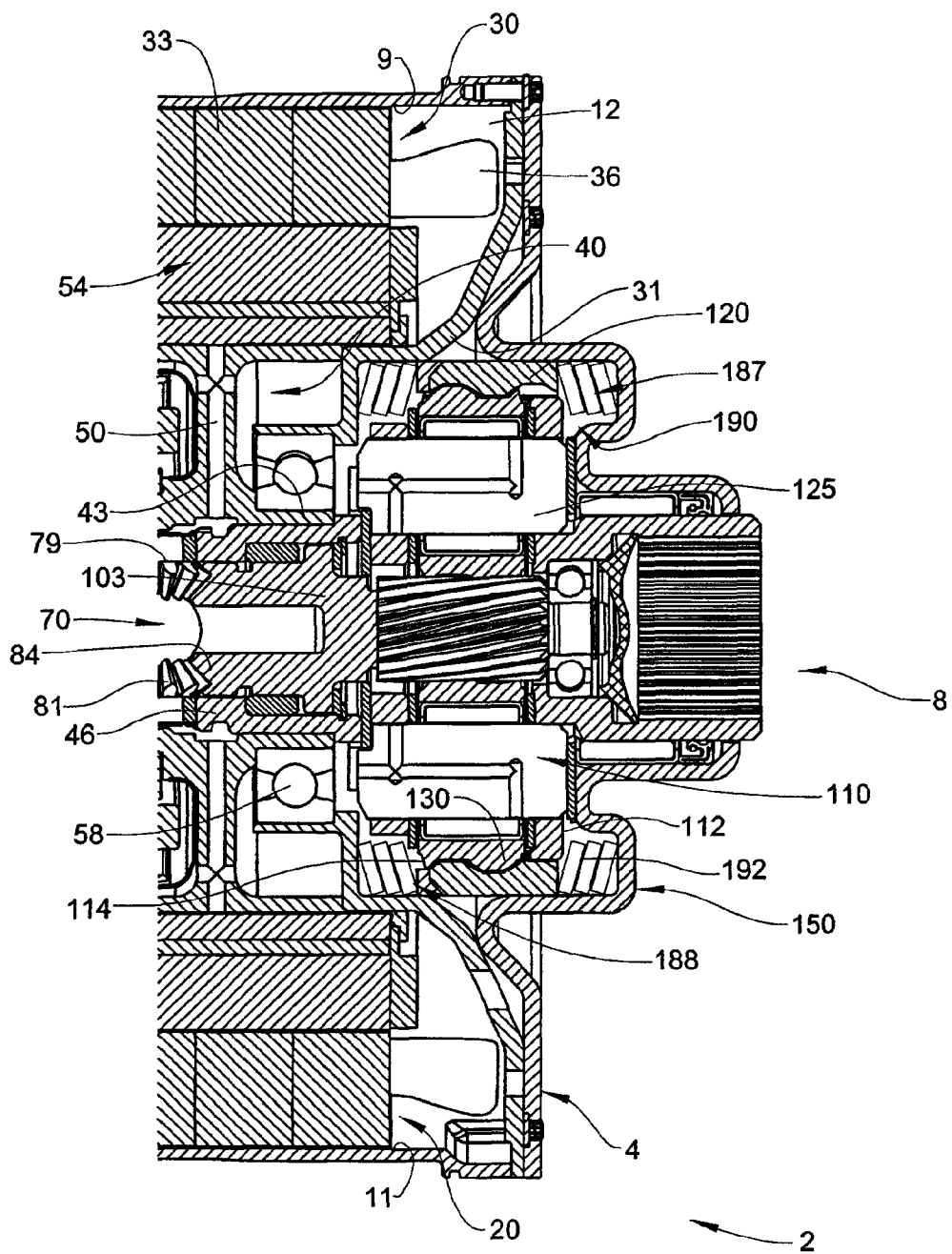
FIG. 4 is a partial cross-sectional side view of the transmission member of FIG. 1 including a gear shock control member in accordance with another aspect of the exemplary embodiment.

In the exemplary embodiment shown, biasing members 180 take the form of coil springs 182. In further accordance with the exemplary embodiment, when installed into transmission member 2, biasing members 180 are pre-loaded or compressed so as to apply a first axial force to first surface 112 of planetary gear set 110. The first axial force applied by first gear shock control member 140 is configured to counter any axial forces generated by sudden stops of transmission member 2. When installed, second gear shock control member 143 is pre-loaded to apply a second axial force onto second surface 114 of planetary gear set 110. The second axial force applied by second gear shock control member 143 is configured to counter forces generated by sudden stops of transmission member 2. At this point it should be understood that the particular form of biasing members can vary. For example, FIG. 4, in which like reference numbers represent corresponding parts in the respective views, illustrates first and second gear shock control members 187 and 188 that include biasing members, such as indicated at 190 that take the form of Belleville or conical spring washers 192. It should also be understood that location of the gear shock control members within the transmission member could vary.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A transmission member comprising:
    a housing including a plurality inner surfaces that collectively define an interior portion;
    a stator housing arranged within the housing, the stator housing including at least one wall member;
    a stator assembly arranged within the stator housing;
    a rotor assembly arranged within the housing, the rotor assembly including a hub portion;
    a gear set arranged within the interior portion and operatively connected to the hub portion, the gear set having a first side and a second side; and
    a gear shock control member positioned between one of the first and second sides of the gear set and an adjacent component comprising one of the plurality of inner surfaces of the housing, the gear shock control member including a plurality of pre-loaded biasing members that direct an axial force onto the gear set;
    another gear shock control member positioned between the other of the first and second sides of the gear set and another adjacent component, the another gear shock control member including another plurality of pre-loaded biasing member that direct an another axial force onto the gear set, wherein the another adjacent component comprises the stator housing.

2. The transmission member according to claim 1, wherein the gear set is a planetary gear set.

3. The transmission member according to claim 1, wherein the gear shock control member includes a first plate member abutting the one of the first and second sides of the gear set and a second plate member abutting the adjacent component, the plurality of pre-loaded biasing members being arranged between the first and second plate members.

4. The transmission member according to claim 3, wherein the plurality of pre-loaded biasing members comprises a plurality of coil springs.

5. The transmission member according to claim 3, wherein the plurality of pre-loaded biasing members comprises a plurality of conical spring washers.

\* \* \* \* \*